UNITED STATES PATENT OFFICE.

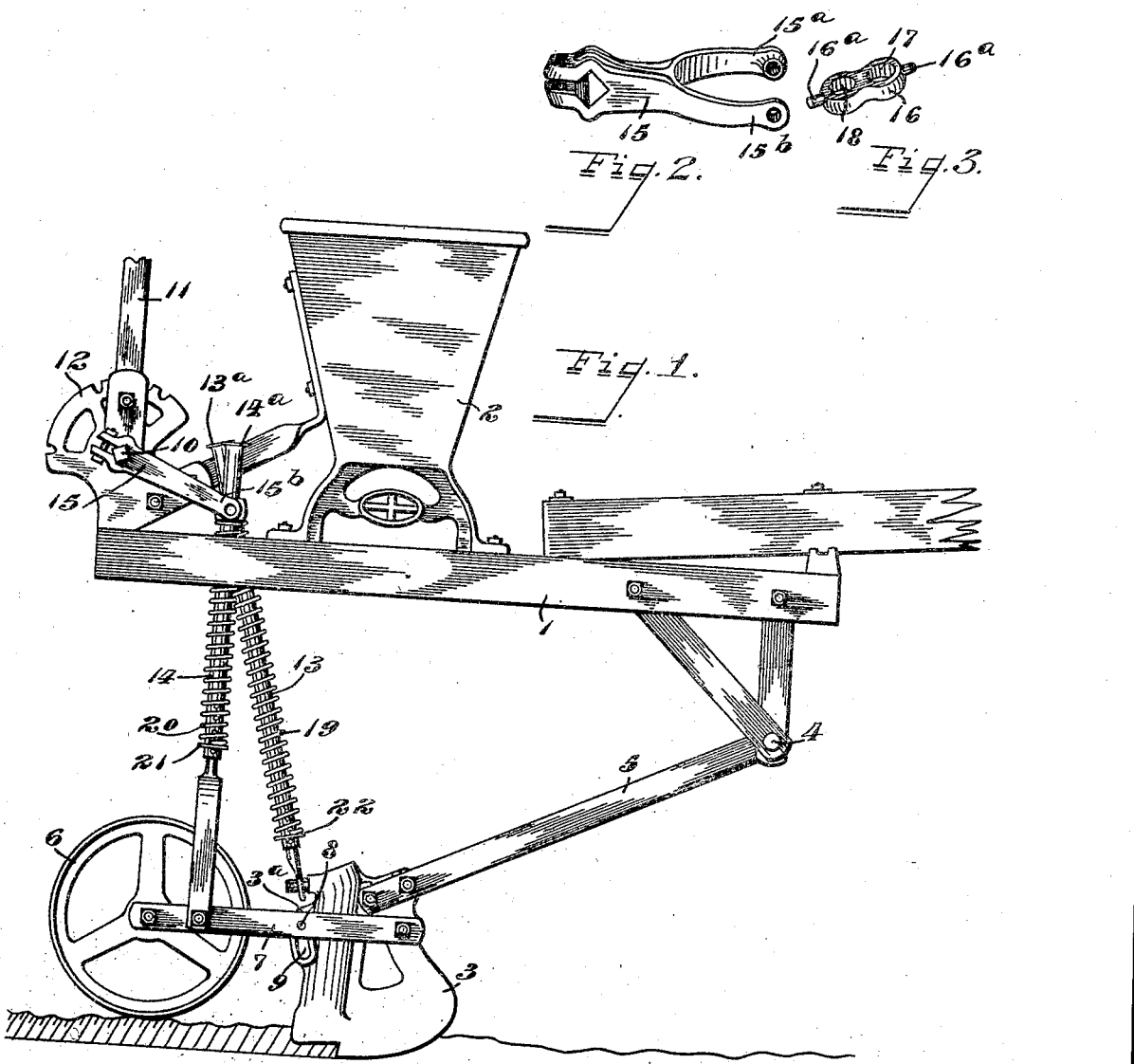

FRANK R. PACKHAM AND WILLIAM L. BRALEY, OF SPRINGFIELD, OHIO, ASSIGNORS TO THE AMERICAN SEEDING MACHINE COMPANY, OF SPRINGFIELD, OHIO, A CORPORATION OF OHIO.

SEEDING-MACHINE.

1,111,175.      Specification of Letters Patent.      Patented Sept. 22, 1914.

Application filed September 30, 1912. Serial No. 723,124.

*To all whom it may concern:*

Be it known that we, FRANK R. PACKHAM and WILLIAM L. BRALEY, citizens of the United States, residing at Springfield, in the county of Clark and State of Ohio, have invented certain new and useful Improvements in Seeding-Machines, of which the following is a specification.

This invention relates to improvements in seeding machines, and more particularly to the furrow opener and covering device thereof.

The object of this invention is to provide independent raising, lowering, and pressure devices for the furrow opener and covering wheel such that said furrow opener and covering wheel will be permitted to drop into depressions into the ground in a uniform manner and to the same extent.

A further object of the invention is to simplify and make more effective devices of this character.

In the accompanying drawings,—Figure 1 is a side elevation showing the parts in a different position from Fig. 1. Fig. 2 is a detail in perspective of one of the operating crank arms. Fig. 3 is a detail in perspective of one of the swivels.

Like parts are represented by similar characters of reference in the several views.

The particular form of seeding machine shown in the drawings is what is known as a beet-seed sowing drill, but the improvements are equally applicable to other forms of seeding machines in which covering wheels are employed in connection with the furrow opening devices.

In the said drawings, 1 represents the main frame, upon which is mounted the usual hopper 2, this frame and hopper being carried by ground wheels (not shown) in the ordinary manner.

3 represents a furrow opener device, shown in the present case in the nature of a shoe, pivotally connected to the draft rod 4 supported from the main frame, by the drag-bar 5; it being understood that a series of these furrow openers are employed but that one only is shown in the drawings.

The press-wheel 6 is of the usual kind, pivotally connected to the furrow opener 3 through the drag-bars 7 in the usual way so as to trail behind the same.

Means are provided, through the medium of a bolt (not shown) which extends through the openings 8 in the drag-bars 7 and also through slotted openings 9 in the portion 3ª of the furrow openers for locking the covering wheels to the furrow openers, in which case they act strictly as gage wheels; but, when the bolt 8 is removed, it will be understood that the wheel 6 floats in the wake of the furrow opener to perform the function of a covering or press-wheel, and the improvements now to be described relate more particularly to the device when the wheel is performing this covering function. In the operation of these devices, it is customary not only to provide for raising and lowering the furrow opener and covering wheel, but also to apply pressure in varying degrees to the same, and when the wheel is floating or trailing loosely behind the furrow opener in performing the function strictly of a covering device, it is desirable that this pressure be applied independently to the wheel and opener in order that they may rise and fall independently of each other in passing over depressions in the ground. Heretofore devices have been employed for applying this independent pressure, but the construction in these prior devices has been such as to prevent the uniform rising and falling of the covering wheel and furrow opener; that is, in passing over depressions of any considerable depth, the construction of these prior devices is such that the covering wheel will not drop to the extreme bottom of the depression, thus interfering with the proper covering of the seed. To overcome this difficulty, and to devise a construction in which the furrow opener and covering wheel will rise and fall uniformly and to the same extent, we have devised the following arrangement of parts.

Extending across the rear of the machine is a rock shaft 10 having an operating lever 11 which has a spring-pressed pawl (not shown) for coöperating with the notches of the segment 12, this rock shaft and lever being the usual one found in machines of this kind. Pivotally connected with the furrow opening device 3 is a rod 13, and pivotally connected with the drag-bars of the covering wheel is a rod 14. Clamped to the rock-shaft 10 is a crank arm 15, between the forked free ends 15ª and 15ᵇ of which is pivotally mounted the trunnions 16ª of a head 16. This head 16 is provided with two eyes or apertures 17 and 18, through which extend respectively the rods 13 and 14, which have collars 13ª and 14ª upon their upper ends in order that the respective furrow opening and covering devices may be raised from the ground. Coiled springs 19 and 20 on the respective rods 13 and 14, and interposed between the head 16 and collars 21 and 22 on said rods, act in conjunction with the crank arm to place a varying pressure upon the furrow opening device and covering wheel. By this construction it will be seen that the covering wheel will be permitted to drop into depressions in the ground to the same extent that the furrow opener has dropped thus insuring a uniform covering of the seed; this operation being due to the fact that the furrow opener and covering wheel rods are both connected to the crank arm at the same distance from its pivotal center. It will also be seen that the double-eyed swivel head permits for connecting the two rods at the same point with respect to the crank arm and, at the same time, allowing them to project in different angular directions with respect thereto.

Having thus described our invention, we claim:—

In a seeding machine, a pivoted furrow opener, a pivoted covering wheel, a crank arm common to said wheel and opener together with means for operating the same, a swiveled head carried by said crank arm having a pair of apertures arranged in proximity to each other, independent rods pivotally connected to said furrow opener and covering wheel, respectively, and extending loosely through said apertures to permit the rise and fall of said opener and wheel independently of said crank arm, projections on the upper ends of said rods whereby said furrow opener and covering wheel may be simultaneously raised by said crank arm, and springs on said rods adapted to be acted upon by said crank arm to simultaneously and independently exert a pressure upon said furrow opener and covering wheel, the connection between said rods and said crank arm being located the same distance from the pivotal point of said crank arm.

In testimony whereof, we have hereunto set our hands this 26th day of September 1912.

FRANK R. PACKHAM.
WILLIAM L. BRALEY.

Witnesses:
　CLYDE A. BROWN,
　CHAS. I. WELCH.